Jan. 16, 1962 S. S. GUTERMAN 3,017,084

MAGNETIC CORE SHIFT REGISTER

Filed Nov. 26, 1954

3 Sheets-Sheet 1

INVENTOR
SADIA S. GUTERMAN
BY Elmer J. Gorn
ATTORNEY

| CONDITION IN STAGE #1 | RESULT IN STAGE #2 | |
|---|---|---|
| | IF IN "0" STATE | IF IN "1" STATE |
| CHANGING FROM "1" TO "0" DOMINANT FACTOR → | CHANGES TO "1" LOADING CURRENT | CHANGES TO "0" TRIGGER PULSE |
| CHANGING FROM "0" TO "1" DOMINANT FACTOR → | REMAINS IN "0" STATE NONE | REMAINS IN "1" STATE NONE |

INVENTOR
SADIA S. GUTERMAN
BY Elmer J. Gorn
ATTORNEY

INVENTOR
SADIA S. GUTERMAN
BY Elmer J. Gorn
ATTORNEY 3,017,084

MAGNETIC CORE SHIFT REGISTER

Sadia S. Guterman, Dorchester, Mass., assignor to Raytheon Company, a corporation of Delaware Filed Nov. 26, 1954, Ser. No. 471,319
3 Claims. (Cl. 235—92)

This invention relates to computing, and particularly to the use of saturable magnetic elements in the handling of computations or analogous information in code pattern as, for example, a binary code utilizing two contrasting digits adapted for representation in the form of two contrasting magnetic saturation conditions brought about alternately in each of said saturable magnetic elements by application of code-controlled pulse energy thereto.

The invention is characterized by the application, to one or more saturable magnetic elements, of saturation-controlling circuitry operable to produce predetermined reactions and operational patterns in said element or elements by utilization of regenerative properties inherent in said circuitry.

The invention is herein illustrated and described in several forms it may assume, each of which forms incorporates a three-element semiconductive device of the "transistor" category, or its equivalent, as the regeneration controlling factor. It is to be understood, however, that the invention, in at least certain of its aspects, is applicable to magnetic computing components having regeneration-controlling circuits incorporating electron tubes or other types of current flow controlling and/or amplifying means to the extent that such other types of current flow controlling and/or amplifying means may be capable of functioning as electronic equivalents of the semiconductive solid state devices herein specifically represented. Accordingly, the invention is to be understood as being limited only by the scope of the inventive principles reflected herein, and not to the specific details illustrated in the accompanying drawings wherein:

All of the illustrated embodiments of the invention involve the utilization of one or more magnetic cores composed of material having high magnetic retentivity and a relatively open hysteresis loop characteristic approaching the rectangular in contour. All illustrated embodiments also exemplify the concept of regeneratively coupling each magnetic core with a semiconductive elements in such a manner that the coupling circuit will have the inherent ability to differentiate between the saturation extremes of the associated magnetic core, and to respond to one but not the other. Thus the coupling circuit may be adapted to respond strongly to the positive gain factor of the regenerative loop, and thereby permit regenerative current flow in the coupling circuit whenever there is occasion to shift the represented binary value from, say, the "1" state to the "0" state, while on the other hand being adapted to remain unresponsive (inactive) whenever the magnetic core of such coupling circuit is standing in the "0" state at the time of application thereto of an "0" value-representing current pulse. Thus the invention takes advantage of the differential response characteristic inherent in the regenerative loop, and also takes advantage of the "inertia" characteristic of the circuit, which characteristic further insures maintenance of the conductive or cutoff condition for the duration of a given cycle, one either of such conditions has been established.

Figure 1:
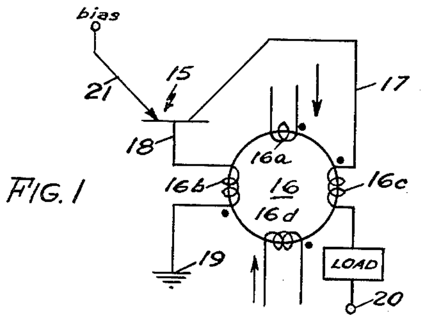
FIG. 1 is a diagram of components and electrical connections constituting a regenerative coupling circuit embodying the invention.

Referring now to FIG. 1, there is disclosed therein a regenerative couple consisting of a transistor 15, a toroidal magnetic core 16, a conductor 17 joining the transistor collector electrode to the core winding 16*c*, adapted to deliver the signal output to the indicated load, and a regenerative feedback line 18 joining the core winding 16*b* to the base electrode of transistor 15. The ends of windings 16*b* and 16*c*, that are remote from the transistor leads, are connected to ground 19 and to negative voltage source 20, respectively. The core 16 has two additional windings 16*a* and 16*d*, the former being the means for delivery of actuating or shift-timing (triggering) pulses to the core, and the latter being the means for delivery of "1" state-restoring, or "reset" pulses to the core. Cutoff bias is applied to the transistor emitter electrode by way of lead 21.

Figure 2:
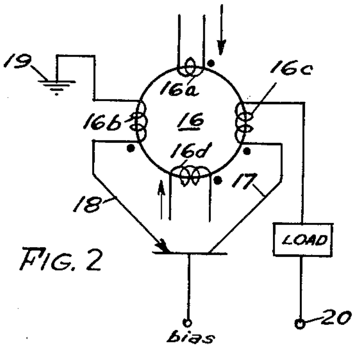
FIGS. 2 and 3 are diagrams of modified regenerative coupling circuits embodying the invention.
Figure 3:
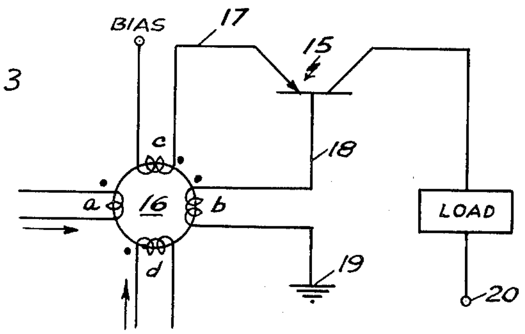

The regenerative couples shown in FIGS. 2 and 3 are the same as that of FIG. 1, except that in FIG. 2 the coupling energy is applied to the emitter electrode rather than to the base electrode, and in FIG. 3 the core winding 16c precedes the emitter electrode rather than following the collector electrode. The corresponding parts bear corresponding reference characters in both views.

The operation of the regenerative couple of either FIG. 1, FIG. 2, or FIG. 3 is a as follows:

Suppose that the core is in the saturation condition (associated with the "1" value of the binary computing system) and that a narrow, low-amplitude, triggering pulse is applied to winding 16*a* in the proper direction to start the shifting of the core flux to the opposite saturation condition. This will cause a voltage to be developed on the winding 16*b* in such a polarity as to cause regenerative current to begin to flow, thus setting up a force operating to continue the flux shift of the core until complete saturation in the opposite direction is established. Since the feedback gain of the coupling circuit is greater than unity, the shifting current will cause a still further increase in the voltage applied at the base of the transistor (FIGS. 1 or 3) or at the emitter electrode in FIG. 2, and this in turn will further increase the shifting current. This regenerative action will continue even though the initial triggering pulse has run its course, so that the completion of the shift of the core flux to the "0" representing state is assured, regardless of the triggering pulse width. Moreover, since the actuating current, once the shift to the "0" state has been accomplished, will produce no further voltage development in the winding 16*b*, the collector current will be subjected to a sudden cessation of flow, for even if there should be some residual inertia factor operative in the collector circuit at this instant the effect thereof would be dissipated within a fraction of a microsecond and hence for all practical purposes the collector current may be considered as stopping sharply due to the regenerative action of the circuit becoming effective to produce such current stoppage at the instant when the core approaches the negative saturation state.

On the other hand if the core 16 were initially in the saturation associated with "0" representing state, application of a trigger pulse of the same polarity would produce no voltage development in the winding *16b*; hence there will be no flow of current in the collector or emitter circuit. Accordingly the core will remain in the "0" representing state notwithstanding the application of the trigger pulse thereto. In other words, the absence of a voltage development in the winding *16b* eliminates the possibility of any regenerative action within the coupling circuit and hence the core remains in its "0" representing saturation state.

It will be noted that on the occasions when the regenerative action occurs, the resulting collector or emitter current flow is the factor which insures completion of the core shift to the opposite saturation condition; hence it is not necessary that the trigger pulse do anything more than simply initiate the regenerative cycle. In other words, once the trigger pulse has accomplished the initiating function, the continuance of the core-shifting operation can be taken over completely by the force represented in the collector or emitter current flow. Because of this circumstance, it is not necessary to employ a trigger pulse of any substantial amplitude or any substantial width; hence the core winding *16a* need have only a very few turns, or even a single turn may suffice, and these windings, if there are a series of cores involved, may be connected in series. In this fashion it becomes possible to utilize a single trigger pulse to actuate a substantial number of serially-connected core windings, such as may be involved in an application of the principles illustrated in FIGS. 1, 2, and 3 to a magnetic core system of multiple stages.

Once a core has been shifted to the "0" representing state, succeeding trigger pulses are of no effect in that the core tends to remain in said "0" representing state, as noted above. In order to produce a new representation of a "1" value, therefore, it will be necessary to restore the core to the opposite saturation condition associated with the "1" value by means other than that available in the triggering circuit. This restoring means may take the form of a restoring current pulse application to the core winding *16d*. Application of such a restoring ("resetting") current pulse to winding *16d* causes the desired reverse saturation, thus resetting the core to the "1" state. This causes development of a voltage in winding *16b* in such a polarity as to cause an increase in the negative voltage prevailing between the emitter and base electrodes; hence the cutoff bias becomes still stronger. Simultaneously, a negative voltage is developed upon winding *16c*, FIG. 1, and this supplements the negative supply voltage, so that the collector voltage is momentarily greater, but notwithstanding this fact there will still be no flow of collector current in view of the relatively strong cutoff bias still prevailing. This current flow inhibiting property of the circuit, which may be referred to as its "buffering" characteristic, which characteristic is inherent in any semiconductive transistor device of the character indicated, is utilized in applying the principles illustrated in FIGS. 1, 2 and 3 to a magnetic shift register of either the single line type illustrated in FIG. 4, or the double line type illustrated in FIG. 5.

Figure 4:
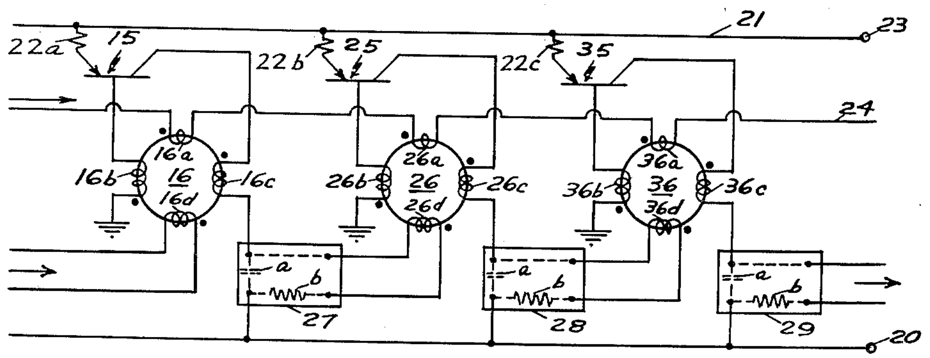
FIG. 4 is a diagram showing the electrical components and interconnections involved in applying the principles illustrated in FIGS. 1, 2, and 3 to the construction of a "single line" type of magnetic computing register.

Referring first to FIG. 4, there is shown therein a three-stage "single line" shift register in which each successive stage is a duplication of the regenerative couple shown in FIG. 1 (although the FIG. 2, or FIG. 3 pattern could also be employed in an analogous fashion) in that the transistors 15, 25, and 35 of the successive stages have their emitter electrodes biased to the cutoff condition by the operation of individual bias control resistors *22a*, *22b*, and *22c*, in the line 21 from source 23, and the cores 16, 26, and 36 have their "trigger" windings *16a*, *26a*, and *36a* connected serially in the "trigger line" 24. Networks 27, 28, and 29 constitute temporary storage points ("delay" units) interposed between the output circuits of the respective stages, on the one hand, and the input ("reset") windings *d* of said cores on the other. The manner of operation is as follows:

When the cores are triggered, those cores having "1" values standing therein will cause a pulse of energy to be transmitted through their respective delay networks, so that after the predetermined delay the energy is delivered to winding *d* of the succeeding cores. If any of these are in the "0" state the pulse operates to reset such cores to the "1" state. Thereafter the next succeeding trigger pulse applied to the winding *16a* of the respective cores will be effective to shift the "1" reading cores back to the "0" state by initiating the regenerative action causing shift in current flow to the *c* windings of said cores in the manner heretofore indicated in connection with the discussion of the invention as applied in FIGS. 1, 2 and 3. Thus the computing cycle may be continued to accomplish the progressive transfer of the two digital values from core to core to produce a pattern corresponding to the content of the signal input to the initial *d* winding of the first core of the series, and at a frequency rate determined by the repetition rate of the pulses applied to the trigger line 24.

The delay networks 27, 28, and 29 of FIG. 4 may be simple R-C combinations employing a single condenser and resistor as indicated by the reference characters *a* and *b* applied to these units as shown in FIG. 4, or the network may be more complex to assure more precise control both of the delay time and of the impedance characteristics of the circuit to prevent undue loading of the cores by application of too much energy thereto during the signal input period, which is the period of occurrence of the regenerative action producing the shift of the core saturation to its opposite polarity. The biasing circuit for the transistor emitter electrodes may include a small limiting resistor of appropriate value in series with each emitter electrode lead. Alternatively, as previously indicated, the biasing could be applied to the base electrodes of the transistors in the manner suggested in FIG. 2, in which case the emitter electrodes would connect with the feedback control windings *b* of the cores as also suggested in FIG. 2.

Figure 5:
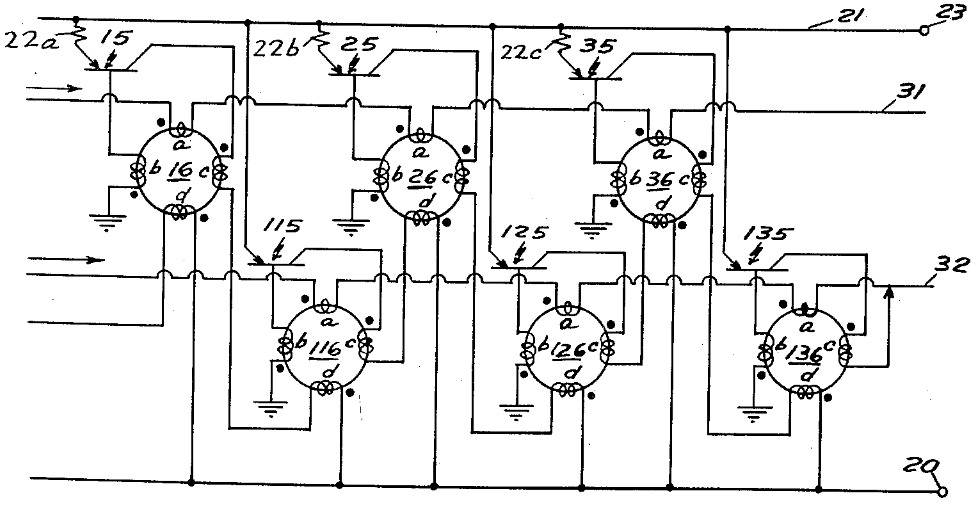
FIG. 5 is a diagram of components and connections constituting a "double line" type of magnetic computing register incorporating the invention.

The shift register illustrated in FIG. 5 differs from that illustrated in FIG. 4 in that it employs two trigger pulse lines 31 and 32 for the core groups 16—26—36 and 116—126—136, respectively, the latter cores being in the nature of fixed storage points, in contrast to the temporary storage points 27, 28, and 29 of FIG. 4. Transistor groups 15—25—35 and 115—125—135 link the respective cores. The operation of the FIG. 5 arrangement is as follows:

First, a trigger pulse is applied to the cores 16, 26, and 36. In those cores of this group which are already in the "0" state, no change occurs, and the same is true of the transistors coupled thereto. On the other hand, those cores which are in the "1" state at this time will be shifted to the "0" state by the regenerative action of their transistors and the resultant current flow into the *c* windings of said cores. At the same time, the corresponding core or cores of the 116—126—136 group having its (or their) winding *d* in series with the activated winding *c* of the associated upper core, will be reset to the "1" state. Thus, in effect the "1" state of an upper core is shifted into the corresponding lower core, for intermediate storage therein, prior to subsequent transfer to the next upper cell in succession in response to application of the next trigger pulse to the lower trigger circuit 32, the shift occurring by reason of the regenerative action of the transistor circuits 115—125—135 associated with said lower core group. Thus the digital pattern is advanced one stage in response to each pair of trigger pulses, applied sequentially to the trigger lines 31 and 32. It will be noted that the shift register of FIG. 5 requires twice as many cores and transistors as the shift register of FIG. 4. On the other hand, it presents the advantage of rendering unnecessary the use of temporary storage or delay units 27, 28, and 29 of FIG. 4, thereby avoiding the power loss which is inherent in such delay units; hence the over-all efficiency and power gain of the FIG. 5 arrangement are higher than in the FIG. 4 arrangement. This gain in efficiency and power consumption is further enhanced by reason of the relatively lower load imposed upon the core windings *d* during the shift of their respective cores to the "0" state, which lower load is due to the relatively high impedance of the transistor collector circuit leading thereto by way of the winding *c* of the preceding intermediate storage core. However, over and beyond these specific advantages of the FIG. 5 arrangement, both the FIG. 4 and the FIG. 5 systems have the following advantages and capabilities:

(1) The registers may incorporate additional branch stages to which the reset pulses may be supplied by either the temporary storage units of FIG. 4 or the fixed storage units of FIG. 5, thus accomplishing branching of the data to additional outlet points, since the amount of energy available for delivery to the respective storage units is considerably greater than that required for a single resetting function, due to the regenerative action of the transistor circuits coupled thereto.

(2) By multiplying the *d* windings of the several cores, or by using a common delay unit for two or more regenerative stages, it is possible to "buffer" two or more stages into a single stage, in accordance with the known buffering technique.

(3) By having one of the *d* windings applied in such a manner as to invert its polarity, it is possible to inhibit the resetting of its particular core on each occasion of shifting of the core of the preceding stage supplying the reset current thereto.

Figure 6:
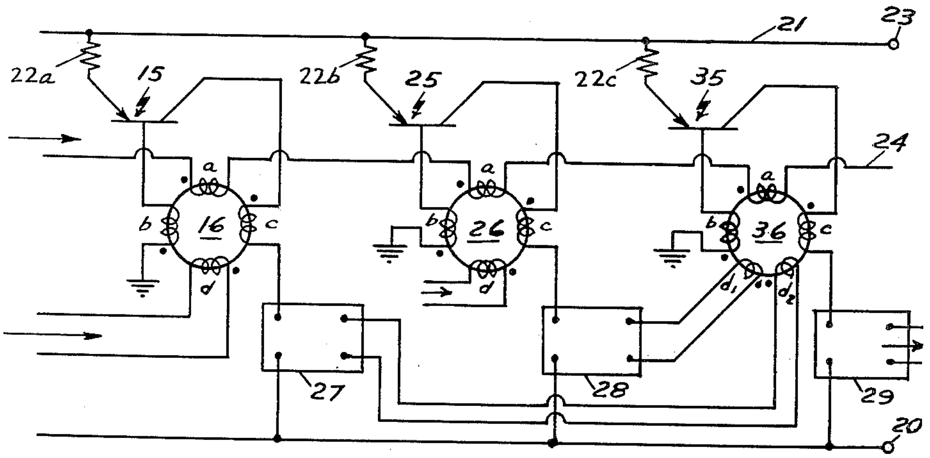
FIG. 6 is a diagram of components and connections illustrating a method of modifying the system of FIG. 4 in order to perform certain logical functions beyond those attainable in FIG. 4.

This reset-inhibiting capability is illustrated in FIG. 6, showing such an inhibiting function incorporated into one of the stages of a single-line shift register. As shown in FIG. 6, the third stage core 36 has an inhibiting winding $d_2$ whose polarity is the reverse of the reset winding $d_1$ as indicated by the relative position of the "dots" adjacent these windings; such dots being applied to the various windings, in the several views, to indicate their relative polarities, and therefore it operates to inhibit the resetting of core 36 on any occasion when a current impulse is transmitted from core 16 to said winding $d_2$ (by way of delay unit 27) simultaneously with delivery of a reset current pulse from core 26 to winding $d_1$ (by way of delay unit 28). In other respects the FIG. 6 register corresponds to that of FIG. 4, and corresponding reference characters designate corresponding elements in the two views.

Thus, in summarization of the three above-enumerated capabilities, it is apparent that the arrangements illustrated in FIGS. 4, 5 and 6 are capable of adaptation and modification to meet the requirements of any specified controlling or logic-achieving functions, to at least the same extent as is possible with any of the single or double line magnetic core shift registers as heretofore known.

Figure 8:
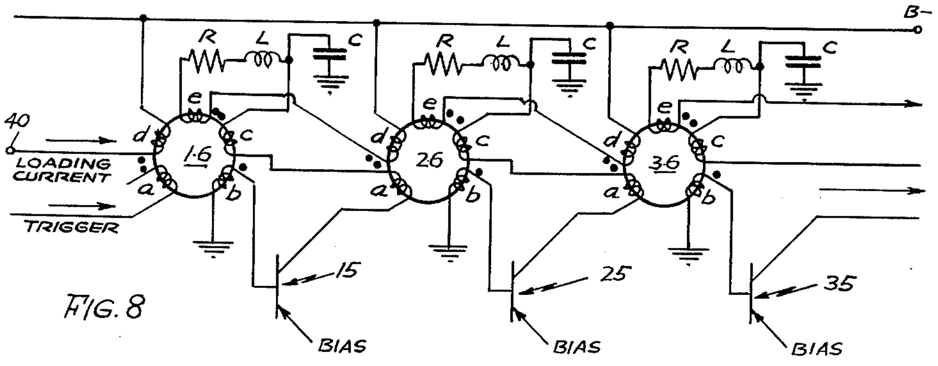
FIG. 8 is a diagram of components and electrical connections for producing binary counting operations in accordance with the principles illustrated in FIG. 7.

The principles above disclosed may also be applied to binary counting operation, as by connecting a number of regenerative coupling stages in cascade relationship, for example, in the manner indicated in FIG. 8. Referring to said FIG. 8, the cores 16, 26 and 36 have windings *a*, *b*, *c* and *d* corresponding to those similarly marked in FIGS. 4 and 5, except that the trigger windings "*a*" of the respective cores of FIG. 8 are individually associated each with its own preceding stage. Before explaining how this rearrangement of the regenerative circuitry facilitates counting in binary code, it should be pointed out that there are, in any binary counting system, two conditions to be fulfilled, namely:

(1) Any binary digital stage, when changing from a "0" state to a "1" state, must refrain from delivering to the next succeeding stage either a trigger pulse or a "loading" current pulse (hereinbefore referred to as a "reset" pulse), since the nature of a binary counting pattern is such that, when one digit shifts from "0" to "1," the following digit should remain in status quo ante. (See the chart forming part of FIG. 7.) In other words, there should be no delivery by the associated transistor circuit of the energy necessary to accomplish such a shift in said succeeding counting stage.

(2) When a preceding stage changes from the "1" to the "0" state, the following stage must shift to a new state, irrespective of which state has been pre-existing therein.

In the system illustrated in FIG. 8 these two conditions are satisfied.

The mode of operation is as follows: The trigger pulse and the loading current pulse are caused to originate simultaneously, but their relative effectiveness is controlled in such manner that the trigger pulse will prevail over the loading current pulse (or vice versa), and (assuming stage No. 1 to be changing from "1" to "0") will cause the transistor collector circuit to produce a sufficient energy flow to shift the succeeding core to a new state; the loading current being the prevailing factor if stage No. 2 is presaturated in the "0" state, and the trigger pulse being the prevailing factor if stage No. 2 is presaturated in the "1" state. This scheme of operation is depicted graphically in FIG. 7, and the electrical connections illustrated in FIG. 8 are operative to carry into execution the FIG. 7 scheme of operation. For this purpose each of the stages illustrated in FIG. 8 (representing three successive stages of a binary counter) includes a delay network R—L—C (which may include any desired number and arrangement of the three indicated components) operative to retard the delivery of the loading current pulse to the "*d*" winding of stage No. 2 for an adjustably sufficient length of time to permit shifting of the core's saturation to the reverse polarity, by the trigger action of the current passing through the "*a*" winding, whenever the pre-existing condition in said stage No. 2 represents the "1" state.

Whenever, in a particular counting stage, the core of said stage is being reset to the "0" state by the regenerative action of its associated transistor collector output circuit, any tendency of the core to revert to the "1" state during the same counting interval, by reason of the possible effect of any stray energy being delivered thereto by way of any of the other windings of said core, is opposed by the reversely-directed action of the fifth winding *e* on said core, said winding *e* of each stage being located, circuitwise, in series with the winding *d* of the next stage. With this arrangement the loading current flowing through the winding *d* of a given stage, being in series with the winding *e* of the preceding stage, operates to inhibit the switching of the core of said preceding stage to the "1" state during the same counting interval in which it has divested itself of a "1" value. In other words, each core is protected against such a double reversal in a single counting interval.

Conversely, if said stage No. 2 is pre-existing in the "0" state, the trigger current passing through the "*a*" winding is ineffective, so that in this circumstance the shift will be delayed for the duration of the preset R—L—C delay interval, and will then occur—the shift on such an occasion being, obviously, from the "0" to the "1" state.

Incidentally, the described delay in the shift action has the additional advantage (on these occasions when stage No. 2 is to be shifted from the "1" to the "0" state) of affording the regenerative circuit for stage No. 3 free and exclusive opportunity to derive its operating impulse from stage No. 2, unhampered by any interference from the loading current, in view of the latter's being delayed in arriving at the point (winding "*d*") where potential interference might otherwise result.

The windings *a* on the cores of FIG. 8 are of relatively few turns, but they receive the entire transistor collector regenerative pulse current of the preceding stage of the counter, hence there is a strong triggering action conducive to efficient counting. With reference to the relative effectiveness of the operation of the trigger and loading pulses in the circuit shown in FIG. 8, the following explanation is given. The relative effectiveness of the trigger and loading pulses is controlled by whether the trigger pulse entering winding "*a*" of stage No. 2 of FIG. 8 encounters a "1" or "0," i.e., whether stage No. 2 is presaturated in the "1" or in the "0" state. It should be noted that the trigger pulse has first opportunity to initiate a change in stage No. 2 because the R—L—C network retards the loading pulse to the "*d*" winding of stage No. 2 for a sufficient time to permit the trigger pulse passing through the "*a*" winding to shift the associated core to a new state of saturation whenever that stage is in the "1" state. In these instances, the trigger is operative and the load pulse, being delayed, is inoperative and ineffective at this time. However, if the trigger pulse entering the "*a*" winding of stage No. 2 encounters an "0" in that stage, the trigger pulse, having the same polarity as the "0," is ineffective to cause regeneration or to shift that stage. Therefore the shift from the "0" to the "1" state will be performed by the load or reset pulse after the appropriate R—L—C delay interval.

Of course, if the preceding stage No. 1 is initially saturated in the "0" representing state and is changed to the "1" state, no trigger or loading pulse will be delivered to stage No. 2 either by way of "*b*" winding of stage No. 1 or by its transistor and, consequently, stage No. 2 will remain unchanged in the absence of a reset pulse.

Figure 7:
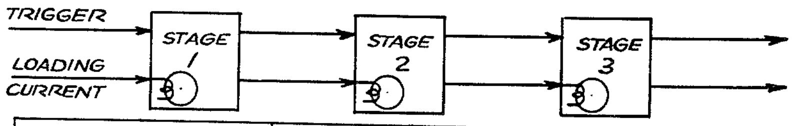
FIG. 7 is a diagram indicating processes involved in performance of binary counting operations in accordance with the principles herein discussed.

In counting, the trigger winding *a* of FIG. 8 passes the entire collector pulse current of the preceding stage, so that it triggers this stage if its core is in the "1" state. As noted, FIG. 7 illustrates the binary counting operation for successive stages of the binary counter of FIG. 8. Where stage No. 2 is in the "0" state, the trigger current passing through the *a* winding is ineffective and the loading current, in response to the preceding stage changing from the "1" to the "0" state, will be effective to change the second stage from the "0" to the "1" state.

Figure 9:
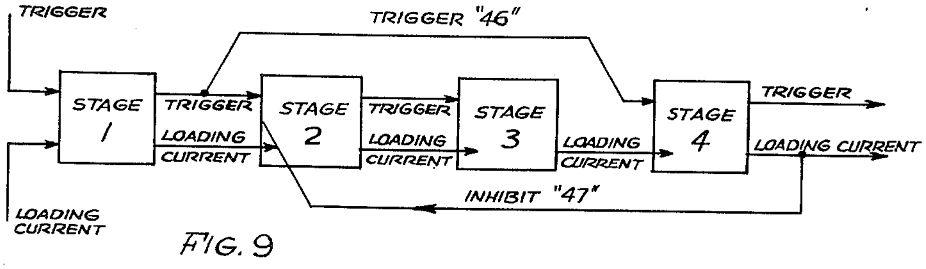
FIG. 9 is a diagram of operations involved in converting binary counting steps to a decimal count.
Figure 10:
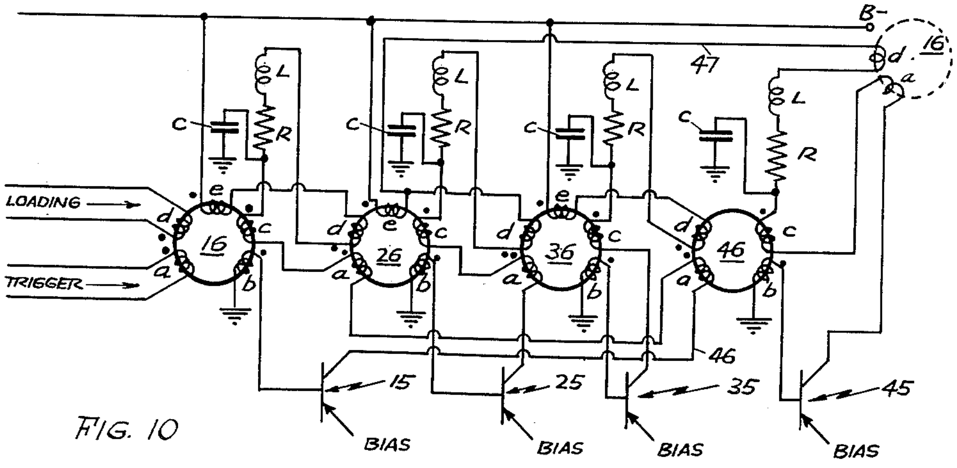
FIG. 10 is a diagram of the components and electrical connections involved in execution of the counting method illustrated in FIG. 9.

FIG. 10 shows the invention applied in a four-stage binary counter in such a manner as to produce a repeating decade count; the scheme of operation being depicted graphically in FIG. 9. Referring to FIG. 10, it will be seen that each of the four stages includes a core wound and interconnected with the other cores and with the associated transistor element in the same manner as in FIG. 8, but there is a trigger connection 46 between the first and fourth stages, instead of between the third and fourth, and an "inhibit" connection 47 between the fourth and second stages, the former operating to return the fourth stage to the "0" state, and the latter operating to prevent the switching of the second stage core from the "0" state to the "1" state, during the interval following the accumulation of a binary count of nine. By reason of this inhibiting action, the four stages of the binary counter are all returned to the "0" state on every tenth counting impulse, and by appropriate means well-known in the art (and therefore not shown) the arrival of the four-stage counter at the tenth counting interval is recorded for the purpose of maintaining cumulative count by decades. Thus the four-stage binary counter is effective to produce a cumulative decimal count by a process of repeating binary entries in groups of nine, with each binary count of nine being followed by a clearing operation restoring all cores to the "0" state. From the foregoing it will be apparent that the successive readings entered into the counter will correspond to the following binary pattern:

| Count | Stage 1 | Stage 2 | Stage 3 | Stage 4 |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 0 | 0 | 0 |

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In a multi-stage system having a field-sustaining element carrying a current-receiving winding, said element included in a first stage of said system, a second field-sustaining element included in a second stage of said system, said second element also having a current-receiving winding, means for shifting the field of said first-stage element, and regenerative means operative through one of said windings to cause delivery of current to the other of said windings in response to operation of said shifting means to tend to produce field-shifting in said second-stage element, and additional inhibiting winding means connected in series with said other winding opposing the field shift-producing tendency of said last-named means.

2. In a multi-stage system having a field-sustaining element carrying two current-receiving windings, said element included in a first stage of said system, a second field-sustaining element included in a second stage of said system, said second element also having a current-receiving winding, means for shifting the field of said first-stage element, and regenerative means originating in one of said windings and operating by way of a second of said windings to cause delivery of current to said third-named winding in response to operation of said shifting means to tend to produce field-shifting in said second-stage element, and additional inhibiting winding means connected in series with said third-named winding opposing the field shift-producing tendency of said last-named means.

3. In a multi-stage digital counter, a field-sustaining element included in a first stage, a second field-sustaining element included in a second stage, regenerative coupling means for supplying field-shifting energy to said second stage to perform a counting operation therein, and winding and energy delay means in series with said regenerative coupling means forming part of said first stage for controlling operation of said regenerative coupling means in a manner adapted to prevent double reversal of said first stage in a single counting interval.

References Cited in the file of this patent

UNITED STATES PATENTS

| | | |
|---|---|---|
| 2,591,406 | Carter | Apr. 1, 1952 |
| 2,652,501 | Wilson | Sept. 15, 1953 |
| 2,654,080 | Browne | Sept. 29, 1953 |
| 2,678,965 | Ziffer | May 18, 1954 |
| 2,710,928 | Whitney | June 14, 1955 |
| 2,760,088 | Pittman et al. | Aug. 21, 1956 |
| 2,772,370 | Bruce et al. | Nov. 27, 1956 |